US011527158B2

(12) United States Patent
Sakurada et al.

(10) Patent No.: US 11,527,158 B2
(45) Date of Patent: *Dec. 13, 2022

(54) INFORMATION PROVIDING SYSTEM, SERVER, ONBOARD DEVICE, AND INFORMATION PROVIDING METHOD

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 14 days.

This patent is subject to a terminal disclaimer.

(21) Appl. No.: 17/304,707

(22) Filed: Jun. 24, 2021

(65) Prior Publication Data

US 2021/0327273 A1  Oct. 21, 2021

Related U.S. Application Data

(63) Continuation of application No. 16/583,413, filed on Sep. 26, 2019, now Pat. No. 11,074,816.

(30) Foreign Application Priority Data

Nov. 29, 2018 (JP) .............................. JP2018-224115

(51) Int. Cl.
*G08G 1/14* (2006.01)
*G06Q 30/02* (2012.01)
*H04W 4/44* (2018.01)

(52) U.S. Cl.
CPC .......... *G08G 1/143* (2013.01); *G06Q 30/0284* (2013.01); *G08G 1/144* (2013.01); *G06Q 2240/00* (2013.01); *H04W 4/44* (2018.02)

(58) Field of Classification Search
CPC .......... G08G 1/143; G08G 1/144; G08G 1/14; G06Q 30/0284; G06Q 2240/00;
(Continued)

(56) References Cited

U.S. PATENT DOCUMENTS 6,553,131 B1 * 4/2003 Neubauer ............... G06V 10/24
   382/105
11,232,301 B2 * 1/2022 Cohen .................... G08G 1/142
(Continued)

FOREIGN PATENT DOCUMENTS

JP  2001-349740 A  12/2001
JP  2004-361325 A  12/2004
(Continued)

*Primary Examiner* — Omar Casillashernandez
(74) *Attorney, Agent, or Firm* — Oblon, McClelland, Maier & Neustadt, L.L.P.

(57) ABSTRACT

An information providing system includes an onboard device and a server that transmits information to and receives information from the onboard device. The onboard device includes a condition setting unit that acquires a destination and an output mode and transmits the acquired destination and the acquired output mode to the server. The onboard device further includes an output unit that outputs parking lot recommendation information which is received from the server. The server includes a storage unit that stores parking lot information including position information of parking lots and parking fees which are detected from a captured image of the parking lots. The server further includes an information providing unit that prioritizes parking lots which are located within a predetermined range from the destination based on the output mode provides the parking lot information of the prioritized parking lots as the parking lot recommendation information to the onboard device.

20 Claims, 10 Drawing Sheets

(58) Field of Classification Search
CPC . H04W 4/44; G01C 21/3602; G01C 21/3685;
G01C 21/343; G01C 21/26; G01C 21/00;
G01C 21/3476; G01C 21/3697; G06V
20/586
USPC .................................................. 340/995.24
See application file for complete search history.

(56) References Cited

U.S. PATENT DOCUMENTS

| | | | |
|---|---|---|---|
| 2005/0021227 A1* | 1/2005 | Matsumoto | G01C 21/3415 701/431 |
| 2007/0040701 A1* | 2/2007 | Browne | G08G 1/143 340/932.2 |
| 2015/0154669 A1* | 6/2015 | Wu | G06Q 30/0284 705/13 |
| 2018/0045535 A1* | 2/2018 | Kim | G08G 1/205 |
| 2018/0130351 A1* | 5/2018 | Ha | G06Q 10/02 |
| 2020/0175871 A1 | 6/2020 | Sakurada et al. | |

FOREIGN PATENT DOCUMENTS

| | | |
|---|---|---|
| JP | 2008-165652 A | 7/2008 |
| JP | 2011-210135 A | 10/2011 |
| JP | 2014-21516 A | 2/2014 |
| JP | 2016-141161 A | 8/2016 |

* cited by examiner

FIG. 6

| PARKING LOT INFORMATION 23 | | | | | | | |
|---|---|---|---|---|---|---|---|
| PARKING LOT ID | PARKING LOT POSITION | PARKING FEE 1 | PARKING FEE 2 | PARKING FEE 3 | ... | IMAGING TIME | AVAILABILITY |

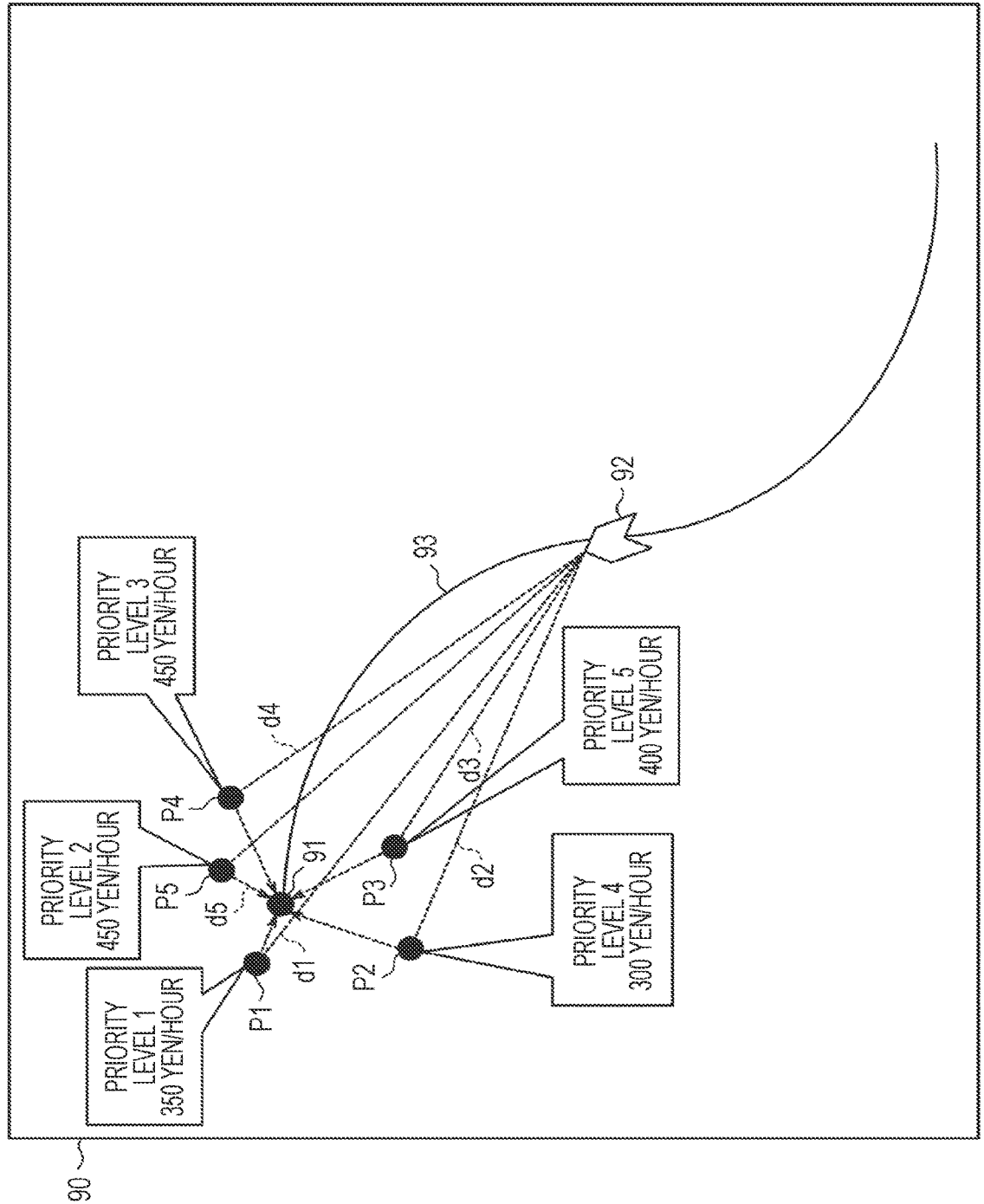

INFORMATION PROVIDING SYSTEM, SERVER, ONBOARD DEVICE, AND INFORMATION PROVIDING METHOD

INCORPORATION BY REFERENCE

This application is a continuation of and claims priority to U.S. patent application Ser. No. 16/583,413, filed Sep. 26, 2019, which claims priority from Japanese Patent Application No. 2018-224115, filed Nov. 29, 2018. The benefit of priority is claimed to each of the foregoing, and the entire contents of each of the foregoing are incorporated herein by reference.

BACKGROUND

1. Technical Field

The present disclosure relates to an information providing system, a server, an onboard device, and an information providing method.

2. Description of Related Art

A navigation device that supports driving of a vehicle provides a user with various types of information as well as guidance for a route to a destination. For example, Japanese Unexamined Patent Application Publication No. 2011-210135 (JP 2011-210135 A) discloses a navigation device that presents information of positions of parking lots in the vicinity of a destination, parking fees thereof, and the like to a user and guides the user on a route to a parking lot which is selected by the user.

SUMMARY

In JP 2011-210135 A, the navigation device receives information on parking lots which are presented to a user from a server of an information provider that provides parking lot information. In such a server, parking lot information which is provided by management companies of parking lots is stored in advance and is transmitted to a navigation device in response to a request from the navigation device.

However, small-scale management companies including individuals may not provide information on their parking lots to an information provider. In this case, the information provider may not store comprehensive information on parking lots in its server. Then, even when parking lots of small-scale management companies are present in the vicinity of a destination, a navigation device may not provide information on such parking lots to a user.

Therefore, the disclosure provides an information providing system or the like that can provide comprehensive information on parking lots to a user.

An information providing system according to a first aspect of the present disclosure includes: an onboard device; and a server configured to transmit information to and receive information from the onboard device. The onboard device includes: a condition setting unit configured to acquire a destination and an output mode and to transmit the acquired destination and the acquired output mode to the server; and an output unit configured to output parking lot recommendation information which is received from the server. The server includes: a storage unit configured to store parking lot information including position information of parking lots and parking fees which are detected from captured image data of the parking lots; and a parking lot recommendation information providing unit configured to prioritize parking lots which are located within a predetermined range from the destination based on the output mode and to provide the parking lot information of the prioritized parking lots as the parking lot recommendation information to the onboard device.

A server according to a second aspect of the present disclosure includes: a communication unit configured to transmit information to and receive information from an onboard device or a mobile terminal; a parking lot information generating unit configured to acquire captured image data which is transmitted from the onboard device or the mobile terminal and position information corresponding to the captured image data, to detect parking fees from the captured image data, and to generate parking lot information including the parking fees and the position information; and a parking lot recommendation information providing unit configured to acquire a destination and an output mode which are transmitted from the onboard device, to prioritize parking lots which are located within a predetermined range from a current position and the destination based on the output mode, and to provide the parking lot information of the prioritized parking lots as parking lot recommendation information to the onboard device.

An onboard device mounted on a vehicle according to a third aspect of the present disclosure includes: a communication unit configured to transmit information to and receive information from the server according to the second aspect; a storage unit configured to store map information including position information of parking lots; a condition setting unit configured to transmit a current position of the vehicle, a destination, and an output mode to the server; and an output unit configured to output parking lot recommendation information which is received from the server.

An information providing method according to a forth aspect of the present disclosure is performed by an onboard device and a server configured to transmit information to and receive information from the onboard device. The information providing method includes: storing, by the server, parking lot information including position information of parking lots and parking fees which are detected from captured image data of the parking lots; acquiring, by the onboard device, a destination and an output mode; transmitting, by the onboard device, the acquired destination and the acquired output mode to the server; prioritizing, by the server, the parking lots which are located within a predetermined range from the destination based on the output mode; providing, by the server, the parking lot information of the prioritized parking lots as parking lot recommendation information to the onboard device; and outputting, by the onboard device, the parking lot recommendation information which is received from the server.

With the information providing system or the like according to the above aspects, it is possible to provide comprehensive information on parking lots to a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram illustrating parking lot information;

FIG. 10 is a diagram illustrating an example of an output mode of parking lot recommendation information.

DETAILED DESCRIPTION OF EMBODIMENTS

Hereinafter, an embodiment of the disclosure will be described with reference to the accompanying drawings.

Figure 1:
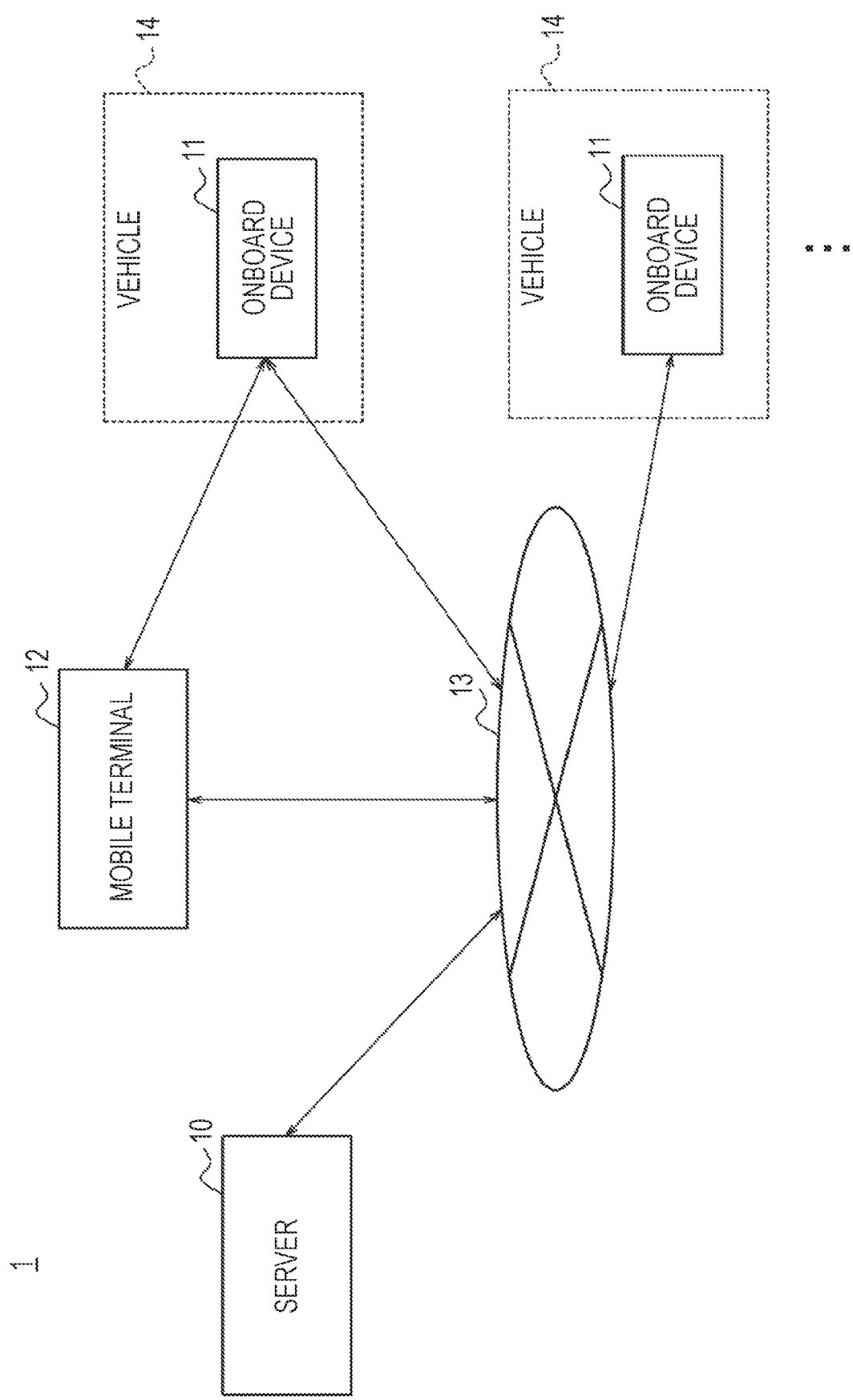
FIG. 1 is a diagram illustrating a configuration of an information providing system.

FIG. 1 is a diagram illustrating a configuration of an information providing system 1 according to an embodiment. The information providing system 1 includes a server 10 and an onboard device 11 which is mounted in a vehicle 14. The vehicle 14 is, for example, an automobile but is not limited thereto and may be an arbitrary vehicle which a user can board. The onboard device 11 has one or both of a navigation function and an imaging function. The server 10 and the onboard device 11 are connected to transmit data to and receive data from each other via a network 13 in a wired or wireless manner. The information providing system 1 may include a plurality of onboard devices 11 which is mounted in a plurality of vehicles 14. The onboard device 11 is connected to a mobile terminal 12 which is carried by a user to transmit data to and receive data from the mobile terminal 12 in a wired or wireless manner. In this configuration, the server 10, the onboard device 11, and the mobile terminal 12 transmit a variety of information to and receive a variety of information from each other.

When the vehicle 14 having the onboard device 11 mounted therein travels in the vicinity of a parking lot, the onboard device 11 recognizes a position of the parking lot using the navigation function, images the parking lot using the imaging function, and transmits position information and captured image data of the parking lot to the server 10. Then, the server 10 detects parking fee information of the parking lot from the captured image and stores the detected parking fee information along with the position information of the parking lot. On the other hand, when the onboard device 11 performs guidance for a route to a destination using the navigation function, the onboard device 11 acquires parking lot information including parking fees and positions of parking lots in the vicinity of a destination from the server 10 and presents parking lot recommendation information to a user in accordance with the order of priority levels in a mode which is set by the user. According to this configuration, it is possible to collect information of parking lots which can be imaged within a range in which the vehicle 14 (preferably a plurality of vehicles 14) travels and to comprehensively provide a user with information of the parking lots in a whole system.

Figure 2:
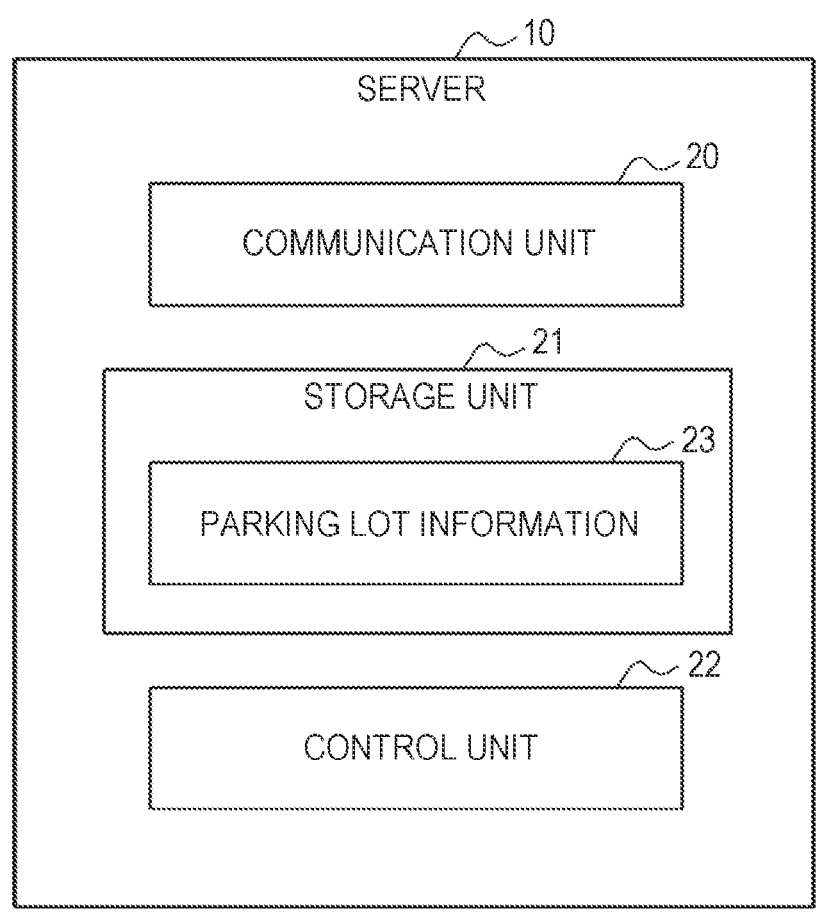
FIG. 2 is a diagram illustrating a configuration of a server.

FIG. 2 illustrates the configuration of the server 10. The server 10 includes a communication unit 20, a storage unit 21, and a control unit 22. The server 10 is a single computer or a plurality of computers that can communicate with each other.

The communication unit 20 includes one or more communication modules that are connected to the network 13. For example, the communication unit 20 may include a communication module corresponding to a wired local area network (LAN) standard. In this embodiment, the server 10 is connected to the network 13 via the communication unit 20.

The storage unit 21 includes one or more memories. Each memory included in the storage unit 21 may function as, for example, a main storage device, an auxiliary storage device, or a cache storage device. The storage unit 21 stores arbitrary information, control processing programs, and databases which are used for operation of the server 10. The storage unit 21 stores, for example, parking lot information 23. The parking lot information 23 will be described later.

The control unit 22 includes one or more processors. Each processor is a general-purpose processor or a dedicated processor specialized in a specific process, but is not limited thereto. The control unit 22 controls the operation of the server 10 in accordance with a control processing program which is stored in the storage unit 21. The control unit 22 also has a clocking function that acquires a current time.

Figure 3:
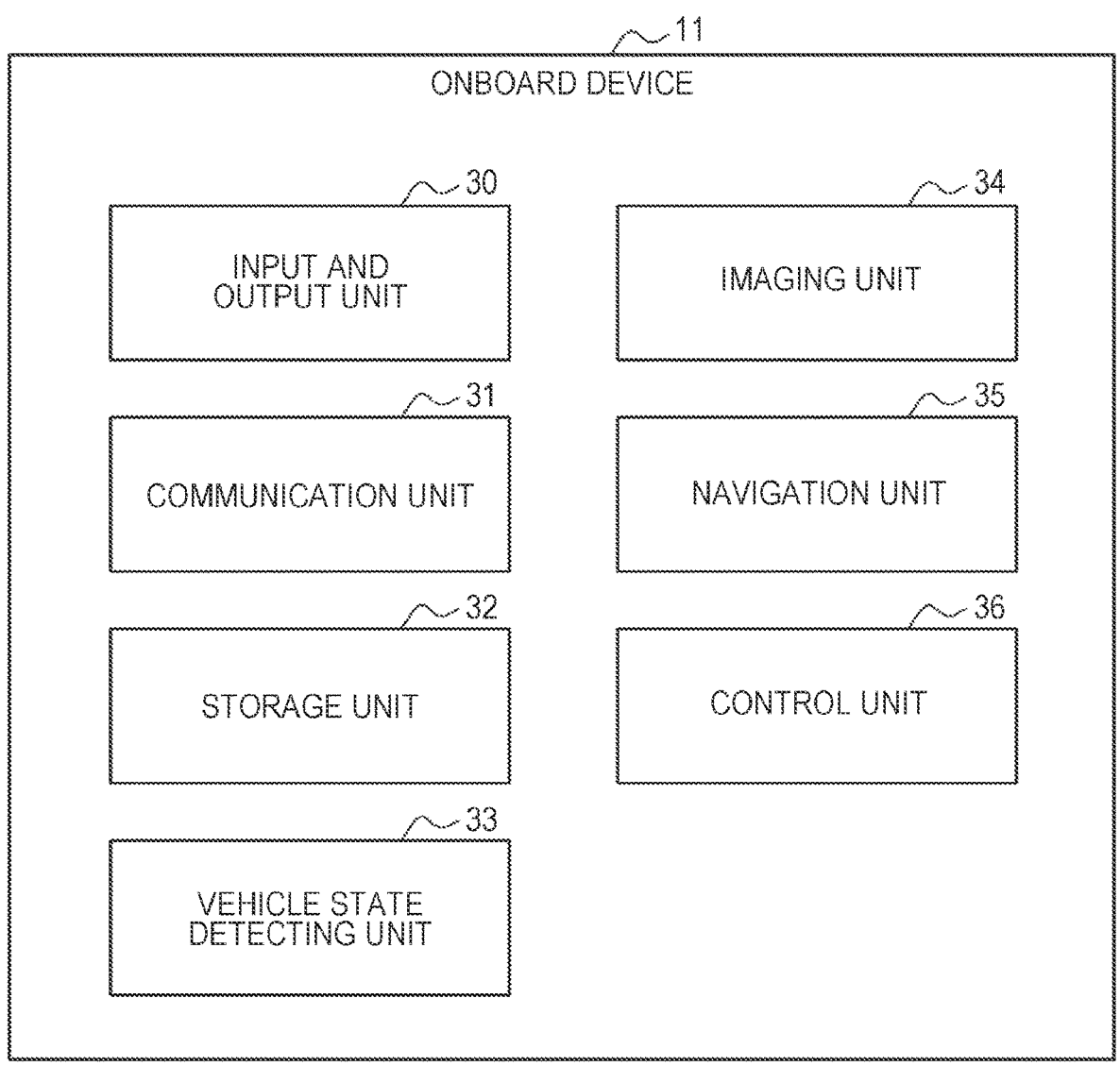
FIG. 3 is a diagram illustrating a configuration of an onboard device.

FIG. 3 illustrates the configuration of the onboard device 11. The onboard device 11 includes an input and output unit 30, a communication unit 31, a storage unit 32, a vehicle state detecting unit 33, an imaging unit 34, a navigation unit 35, and a control unit 36.

The input and output unit 30 includes an input interface that detects a user's input and supplies input information to the navigation unit 35, the control unit 36, and the like. The input interface includes, for example, physical keys, capacitive keys, a touch screen that is provided integrally with a panel display, or a microphone that receives a sound input, but is not limited thereto and may be an arbitrary input interface. The input and output unit 30 includes an output interface that outputs information, which is generated by the navigation unit 35 or the control unit 36 or acquired from the server 10, to a user. The output interface includes, for example, a panel display that outputs information as a still image or a moving image, a head-up display, or a speaker that outputs information as sound, but is not limited thereto and may be an arbitrary output interface.

The communication unit 31 includes one or more communication modules. For example, each communication module may include a module corresponding to a mobile communication standard such as 4th generation (4G) and 5th generation (5G). The communication unit 31 may include a communication device such as a data communication module (DCM). The onboard device 11 is connected to the network 13 via the communication unit 31 and performs data communication with the server 10. The communication module includes, for example, a module corresponding to a short-range radio communication standard such as Bluetooth (registered trademark), a wired local area network (LAN) standard, or a wireless LAN standard. The onboard device 11 performs data communication with the mobile terminal 12 via the communication unit 31. The communication module includes a global positioning system (GPS) receiver module. The onboard device 11 receives GPS signals through the communication unit 31.

The storage unit 32 includes one or more memories. Each memory included in the storage unit 32 may be, for example, a semiconductor memory, a magnetic memory, or an optical memory, but is not limited thereto. Each memory may serve as, for example, a main storage device, an auxiliary storage device, or a cache storage device. The storage unit 32 stores arbitrary information which is used for operation of the onboard device 11. For example, the storage unit 32 may store control processing programs and embedded software.

The vehicle state detecting unit 33 includes, for example, various sensors that detect a vehicle speed, acceleration, a steering angle, and a yaw rate. The vehicle state detecting unit 33 detects various vehicle states at predetermined intervals. Information on various vehicle states which are detected by the vehicle state detecting unit 33 is supplied to the navigation unit 35 and the control unit 36 at predetermined intervals.

The imaging unit 34 realizes an imaging function of the onboard device 11. The imaging unit 34 includes one or more cameras that image scenes or subjects in front in the travel direction of the vehicle 14, in lateral directions of the vehicle 14, and behind the vehicle 14. Each camera of the imaging unit 34 may be a monocular camera or a stereoscopic camera. The imaging unit 34 captures an image of a scene or a subject outside the vehicle, generates captured image data, and supplies the generated captured image data to the control unit 36.

The navigation unit 35 realizes the navigation function of the onboard device 11. The navigation unit 35 includes one or more processors that perform processes associated with route guidance. The navigation unit 35 acquires map information from the storage unit 32, acquires a user's input information from the input and output unit 30, or acquires a user's schedule information which is transmitted by the mobile terminal 12 from the communication unit 31. The navigation unit 35 acquires a current position (for example, latitude and longitude) of the vehicle 14 which is detected by the control unit 36 from the control unit 36. The navigation unit 35 presents information for route guidance to a user through the input and output unit 30 based on the user's input information, the schedule information, the current position, and the like. The navigation unit 35 acquires parking lot recommendation information from the server 10 via the communication unit 31 and presents the acquired parking lot recommendation information to a user via the input and output unit 30. The navigation unit 35 acquires parking lot recommendation information from the server 10 via the communication unit 31 and presents the acquired parking lot recommendation information to a user via the input and output unit 30.

The control unit 36 includes one or more processors. Each processor is a general-purpose processor or a dedicated processor specialized in a specific process, but is not limited thereto. For example, an electronic control unit (ECU) which is mounted in the vehicle 14 may function as the control unit 36. The control unit 36 comprehensively controls the operation of the onboard device 11. The control unit 36 also has a clocking function that acquires a current time.

Figure 4:
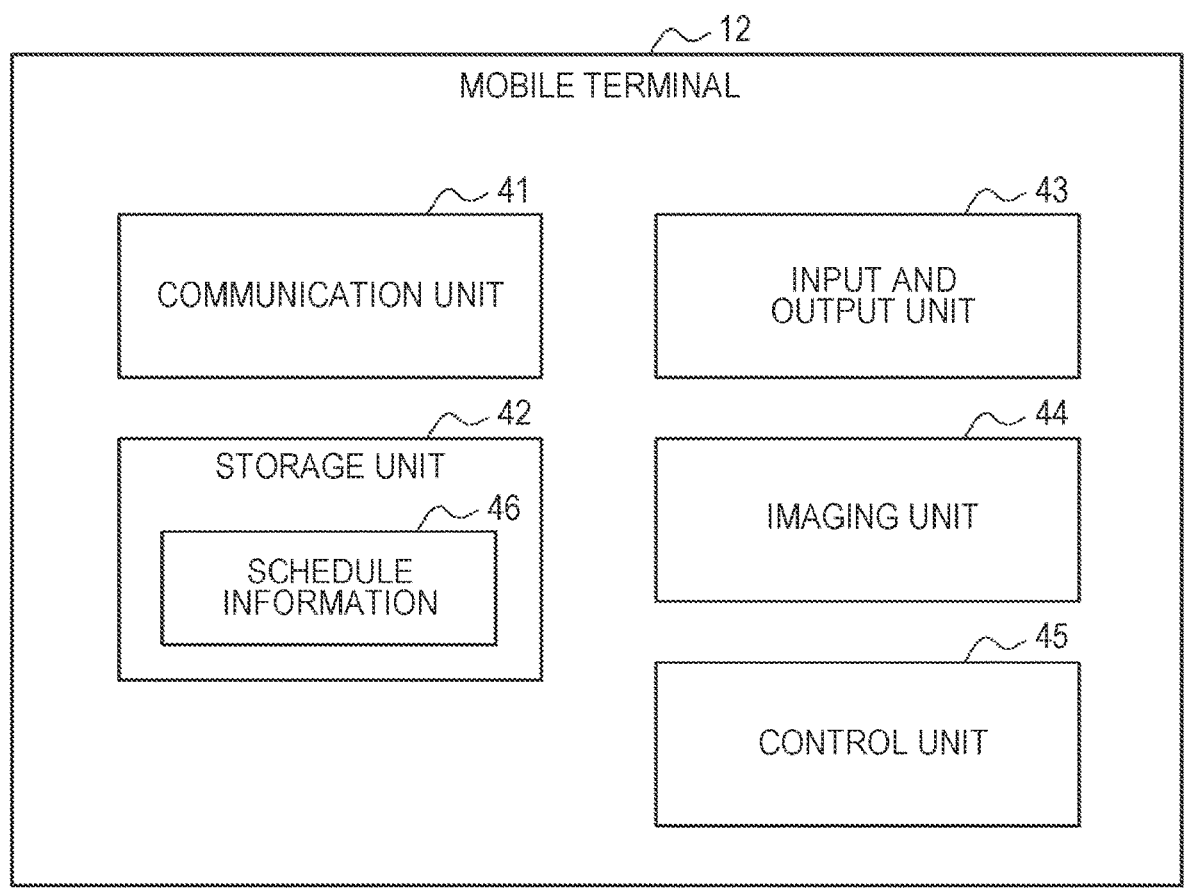
FIG. 4 is a diagram illustrating a configuration of a mobile terminal.

FIG. 4 illustrates the configuration of the mobile terminal 12. The mobile terminal 12 includes a communication unit 41, a storage unit 42, an input and output unit 43, an imaging unit 44, and a control unit 45. The mobile terminal 12 is a portable electronic device such as a smartphone or a tablet.

The communication unit 41 includes one or more communication modules that are connected to the network 13. For example, each communication module may include a module corresponding to a mobile communication standard such as 4th generation (4G) and 5th generation (5G). The mobile terminal 12 is connected to the network 13 via the communication unit 41. The communication module includes a GPS receiver module. The mobile terminal 12 receives GPS signals indicating a current position through the communication unit 41.

The storage unit 42 includes one or more memories. Each memory is, for example, a semiconductor memory, but is not limited thereto. Each memory may serve as, for example, a main storage device, an auxiliary storage device, or a cache storage device. The storage unit 42 stores arbitrary information associated with a control processing operation of the mobile terminal 12. The storage unit 42 stores schedule information 46 corresponding to a behavior schedule which is input by a user.

The input and output unit 43 includes an input interface that detects a user's input and supplies input information to the control unit 45. The input interface includes, for example, physical keys, capacitive keys, a touch screen that is provided integrally with a panel display, or a microphone that receives a sound input, but is not limited thereto and may be an arbitrary input interface. The input and output unit 43 includes an output interface that outputs information, which is generated by the control unit 45 or read from the storage unit 42, to a user. The output interface includes, for example, a panel display that outputs information as a still image or a moving image or a speaker that outputs information as sound, but is not limited thereto and may be an arbitrary output interface.

The imaging unit 44 includes one or more cameras. Each camera may be a monocular camera or a stereoscopic camera. The imaging unit 44 captures an image of a scene or a subject in response to a user's operation and generates captured image data.

The control unit 45 includes one or more processors. Each processor is a general-purpose processor or a dedicated processor specialized in a specific process, but is not limited thereto. The control unit 45 controls the operation of the mobile terminal 12 in accordance with a control processing program which is stored in the storage unit 42 and executes various application programs.

The operation of the information providing system 1 according to this embodiment will be described below.

Figure 5:
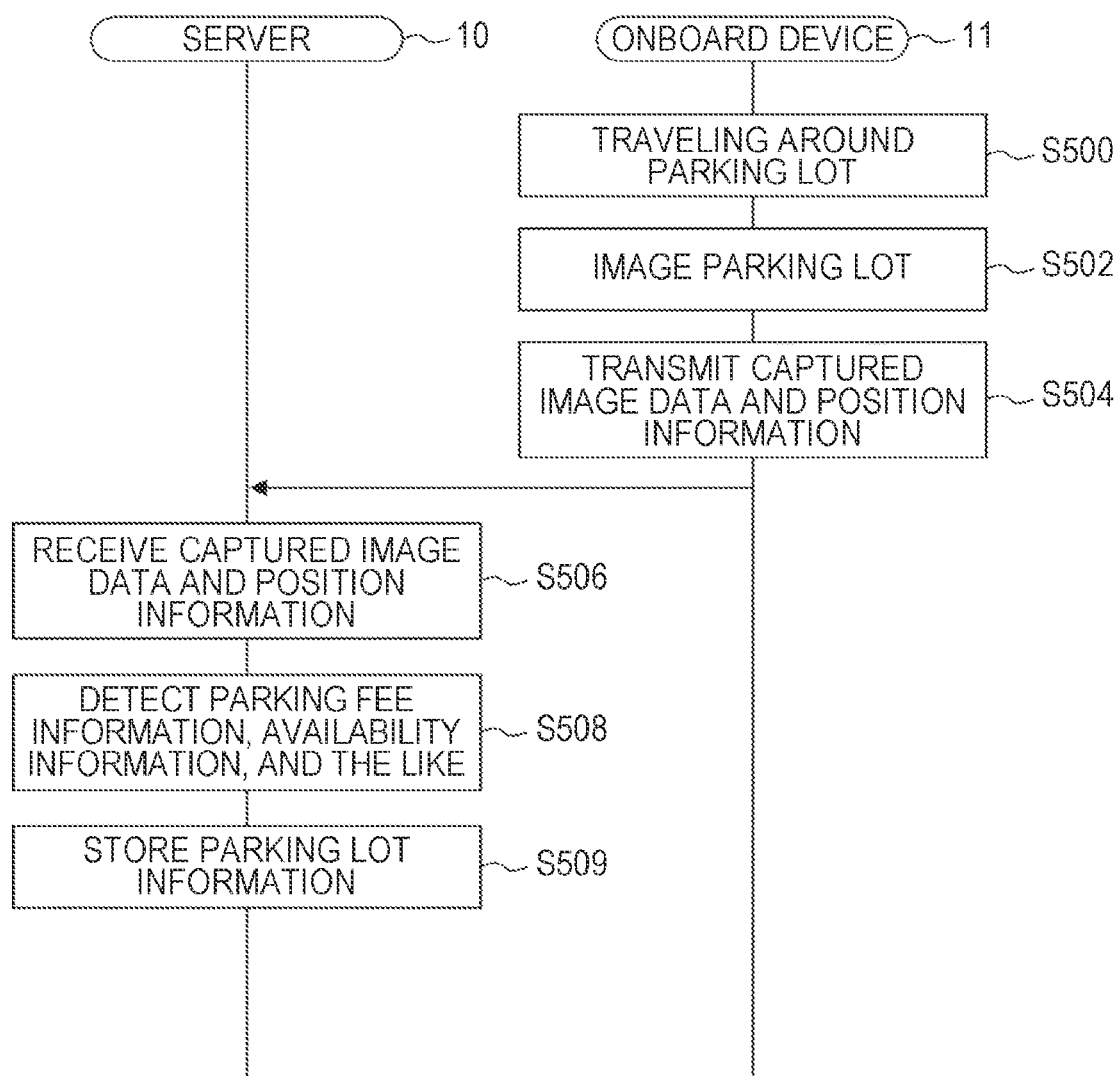
FIG. 5 is a sequence diagram illustrating operations of the information providing system.

FIG. 5 is a sequence diagram illustrating the operation of the information providing system 1 when parking lot information is detected from a captured image. The sequence illustrated in FIG. 5 is performed at predetermined intervals (for example, every several seconds to several tens of seconds) while the vehicle 14 in which the onboard device 11 is mounted is traveling.

When it is detected that the vehicle 14 is located in the vicinity of a parking lot while the vehicle 14 is traveling (operation S500), the onboard device 11 captures an image of the parking lot (operation S502) and transmits captured image data and position information of the imaged parking lot to the server 10 (operation S504). In the onboard device 11, the units that perform operations S502, S503, and S504 are examples of an "imaging control unit."

In the onboard device 11, for example, when it is detected that the vehicle 14 is located within a predetermined distance (for example, 10 m to 20 m) from a parking lot on a map based on the current position and the map information, the navigation unit 35 supplies a notification indicating that fact along with position information (for example, latitude and longitude) of the parking lot to the control unit 36. Then, in response to this notification, the control unit 36 instructs the imaging unit 34 to capture an image and the imaging unit 34 images a scene or a subject outside the vehicle. At this time, a scene or a subject outside the vehicle may include a parking lot and a parking fee indication. The control unit 36 acquires captured image data from the imaging unit 34 and transmits the captured image data along with the position information of the parking lot to the server 10 via the communication unit 31. At this time, for example, the control unit 36 may acquire GPS signals at the time of capturing an image from the communication unit 31, detect the current position of the vehicle 14 from the GPS signals, and transmit the detected position information along with the captured image data to the server 10.

Subsequently, when the captured image data and the position information are received (operation S506), the server 10 detects parking fee information, availability information, and the like from the captured image (operation S508), and stores the detected information as parking lot information 23 in the storage unit 21 (operation S509). In the server 10, the units that perform operations S506, S508, and S509 are examples of a "parking lot information generating unit."

In the server 10, for example, the control unit 22 identifies and extracts character information from the captured image. Then, the control unit 22 performs a character recognition process on the extracted character information and extracts the parking fee information. The parking fee information includes a day, a time line, and a temporal unit price. The temporal unit price may be expressed in different unit times or expressions such as "500 yen per hour," "500 yen/hour," and "100 yen per 10 minutes" depending on the parking lots. Therefore, by storing table data for converting different expression patterns into a consistent rate in the storage unit 21 in advance and referring to the table data, the control unit 22 converts the temporal unit prices of the parking fee information into a consistent rate (for example, "yen/hour") and stores the converted rate. Therefore, parking fees can be easily compared.

The control unit 22 may extract availability information by performing a character recognition process on the extracted character information. For example, the control unit 22 may extract characters "vacant" or "full" and determine that the availability is "there is a vacancy" or "there are no vacancies." For example, when vacancy or fullness is expressed by flickering of characters in an electric bulletin such as "vacant" and "full," the control unit 22 may determine "there is a vacancy" or "there are no vacancies" on the premise that characters such as "vacant" or "full" have higher luminance than other characters. In a parking lot in which vehicles are horizontally parked outside a structure, the control unit 22 may extract availability information by performing a pattern recognition process on a captured image. For example, the control unit 22 may identify an image of parked vehicles 14 from a background image of the parking lot. Then, the control unit 22 determines vacancies in the parking lot, for example, based on an area ratio between the background image and the image of parked vehicles in the whole captured image. For example, the vacancies may be determined in several steps such as "there are many vacancies," "there are few vacancies," and "there are no vacancies." The availability information includes, for example, an imaging time and vacancies at the imaging time.

FIG. 6 illustrates parking lot information 23 which is stored in the storage unit 21. The parking lot information 23 includes, for example, information such as a parking lot ID, a parking lot position, parking fees 1 to n (where n is an arbitrary natural number), an imaging time, and vacancies for each parking lot. The parking lot ID is uniquely allocated to a parking lot by the control unit 22 when parking lot information is stored in the storage unit 21. Regarding parking fees 1 to n, the same parking lot has parking fees on different days and time lines. For example, each of parking fees 1 to n includes a day, a time line, and a unit fee. For example, parking fee 1 includes a unit fee at 7:00 to 15:00 on a weekday, parking fee 2 includes a unit fee at 15:00 to 7:00 on a weekday, and parking fee 3 includes a unit fee at 0:00 to 24:00 on Saturdays and Sundays.

Figure 7:
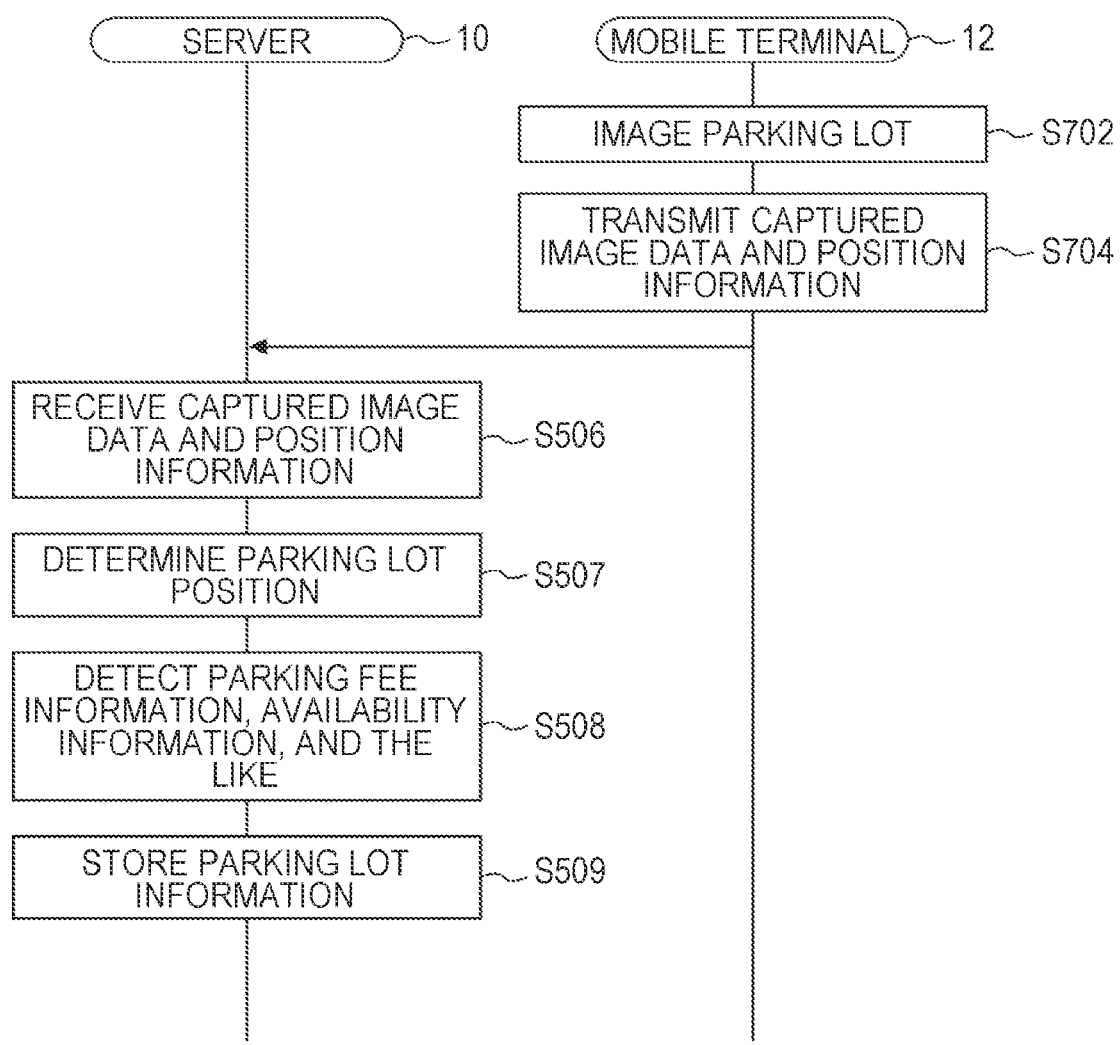
FIG. 7 is a sequence diagram illustrating operations of the information providing system.

FIG. 7 illustrates a modified example of the sequence illustrated in FIG. 5. Operations S506, S508, and S509 which are performed by the server 10 are the same as illustrated in FIG. 5. Here, imaging of a parking lot is performed by the mobile terminal 12 instead of the onboard device 11. For example, when a user passes by the vicinity of a parking lot while the user is moving in a vehicle 14 or is moving without using a vehicle 14, the user arbitrarily images the parking lot with the mobile terminal 12 (operation S702). Then, the mobile terminal 12 transmits captured image data and position information of the imaged parking lot to the server 10 (operation S704).

In the mobile terminal 12, the control unit 45 causes the imaging unit 44 to capture an image, for example, in response to a user's operation input to the input and output unit 43. The control unit 45 acquires GPS signals via the communication unit 41 and detects a current position. Then, the control unit 45 acquires captured image data from the imaging unit 44 and transmits the captured image data along with the position information to the server 10 via the communication unit 41. The mobile terminal 12 may prompt a user to capture an image instead of causing the user to arbitrarily image a parking lot. For example, the control unit 45 may periodically detect the current position from the GPS signals, compare the current position with the map information stored in the storage unit 42, and may output a notification for prompting a user to capture an image via the input and output unit 43 when it is detected that the user is located within a predetermined distance (for example, 5 m to 10 m) from the parking lot on the map.

Subsequently, when the captured image data and the position information are received (operation S506), the server 10 compares the map information stored in the storage unit 21 with the received position information, checks whether a position at which the imaging has been performed matches a location of the parking lot on the map, and determines the received position information as the position of the parking lot (operation S507). Then, the server 10 detects parking fee information and availability information from the captured image on the premise that the position of the parking lot has been determined (operation S508) and stores the detected information as the parking lot information 23 in the storage unit 21. In this modified example, when captured image data which is arbitrarily captured by a user is transmitted to the server 10, parking lot information can be detected from the captured image data having a high likelihood that it will be a captured image of a parking lot by checking whether the imaging position matches the location of the parking lot on the map, and thus it is possible to skip unnecessary processes.

Figure 8:
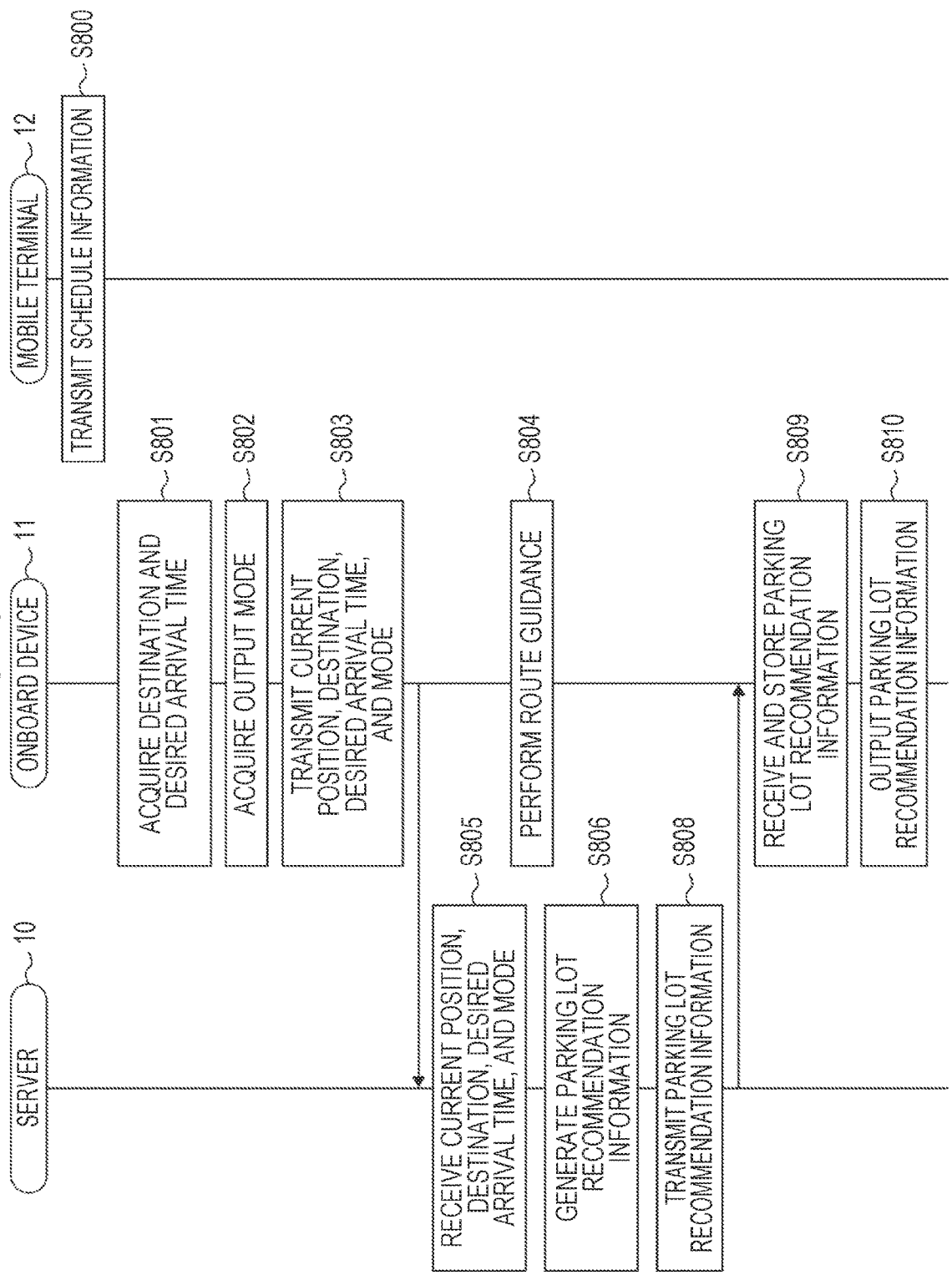
FIG. 8 is a sequence diagram illustrating operations of the information providing system.

FIG. 8 is a sequence diagram illustrating the operations of the information providing system 1 when the onboard device 11 presents parking lot recommendation information. The sequence illustrated in FIG. 8 is performed when a user starts the onboard device 11.

The onboard device 11 acquires a destination or a desired arrival time in addition to the destination (operation S801). In the onboard device 11, for example, the navigation unit 35 acquires the destination or the like by causing a user to input the destination or the like to the navigation unit 35 via the input and output unit 30. For example, by causing the mobile terminal 12 to transmit schedule information 46 of a user (operation S800) and causing the navigation unit 35 to receive the schedule information 46, the onboard device 11 may acquire the destination or the desired arrival time from scheduled visit place information and scheduled visit date which are included in the schedule information 46.

Then, the onboard device 11 acquires an output mode (operation S802). The output mode is a mode indicating a user's preference in outputting parking lot information. The output mode includes, for example, a parking fee priority mode and a required time priority mode, but is not limited thereto. The onboard device 11 acquires the output mode, for example, by allowing a user to select or input the output mode via the input and output unit 30.

The onboard device 11 transmits the current position of the vehicle 14, the destination, the desired arrival time, and the output mode to the server 10 (operation S803). The control unit 36 acquires GPS signals from the communication unit 31 and detects the current position from the GPS signals. Then, in the onboard device 11, the navigation unit 35 starts route guidance from the current position to the destination (operation S804).

In the onboard device 11, the units that perform operations S801, S802, and S803 correspond to a "condition setting unit."

The server 10 receives the current position of the vehicle 14, the destination, the desired arrival time, and the output mode from the onboard device 11 (operation S805), generates parking lot recommendation information based on the destination, the desired arrival time, and the output mode (operation S806), and transmits the parking lot recommendation information to the onboard device 11 (operation S808). In the server 10, the units that perform operations S805, S806, and S808 are examples of a "parking lot recommendation information providing unit."

For example, the control unit 22 reads the parking lot information 23 from the storage unit 21 and extracts parking lot information of parking lots of which the positions are within a predetermined range from the destination. The predetermined range is, for example, a range in which a user can reach the destination at the desired arrival time when the vehicle 14 travels from the current position to the parking lot within the predetermined range and arrives at the destination on foot from the parking lot. For example, the control unit 22 calculates a required time from the current position of the vehicle 14 to the position of the parking lot by vehicle for each parking lot based on a predetermined average traveling speed (for example, a speed limit on the route). Alternatively, the onboard device 11 may transmit a vehicle speed along with a destination to the server 10 and the control unit 22 may calculate the required time using the vehicle speed. The control unit 22 calculates a required time from the parking lot to the destination on foot based on a predetermined average walking speed (for example, 4 km/h to 6 km/h). Then, the control unit 22 calculates the sum of the required time by vehicle and the required time on foot (the total required time) and determines whether the parking lot is within the predetermined range by determining whether a scheduled arrival time which is obtained by adding the total required time to the current time is prior to the desired arrival time.

When a user does not set a desired arrival time, the predetermined range may be set to a predetermined distance (for example, equal to or less than 1 km) from the destination. The predetermined distance may be a straight distance or a moving distance which is predicted on foot. At this time, the control unit 22 may exclude a parking lot of which the availability is "there is no vacancy."

Then, the control unit 22 prioritizes the extracted parking lot information based on the output mode and generates parking lot recommendation information.

For example, when the output mode is a fee priority mode, the control unit 22 prioritizes the extracted parking lot information in ascending order of parking fees and generates the parking lot recommendation information. For example, the control unit 22 calculates a predicted arrival time at each parking lot based on the current position of the vehicle 14 and the current time, and prioritizes the parking lot information using the parking fees on the day and in the time line corresponding to the predicted arrival time. At this time, when the parking fees of a plurality of parking lots are the same, the control unit 22 gives priority to a parking lot in which the total required time for arrival at the destination via the parking lot is the shortest.

For example, when the output mode is a required time priority mode, the control unit 22 prioritizes the extracted parking lot information in ascending order of the total required times for arrival at the destination when the vehicle is parked at the parking lot, and generates parking lot recommendation information. Here, for example, when the total required times of a plurality of parking lots are the same, the control unit 22 gives priority to a parking lot in which the parking fee is the lowest.

Subsequently, the server 10 transmits the generated parking lot recommendation information to the onboard device 11 (operation S808). The onboard device 11 receives the parking lot recommendation information and stores the received parking lot recommendation information in the storage unit 32 (operation S809). Then, the onboard device 11 outputs the parking lot recommendation information (operation S810). In the onboard device 11, for example, the control unit 36 outputs the parking lot recommendation information as an image to the panel display of the input and output unit 30.

Figure 9:
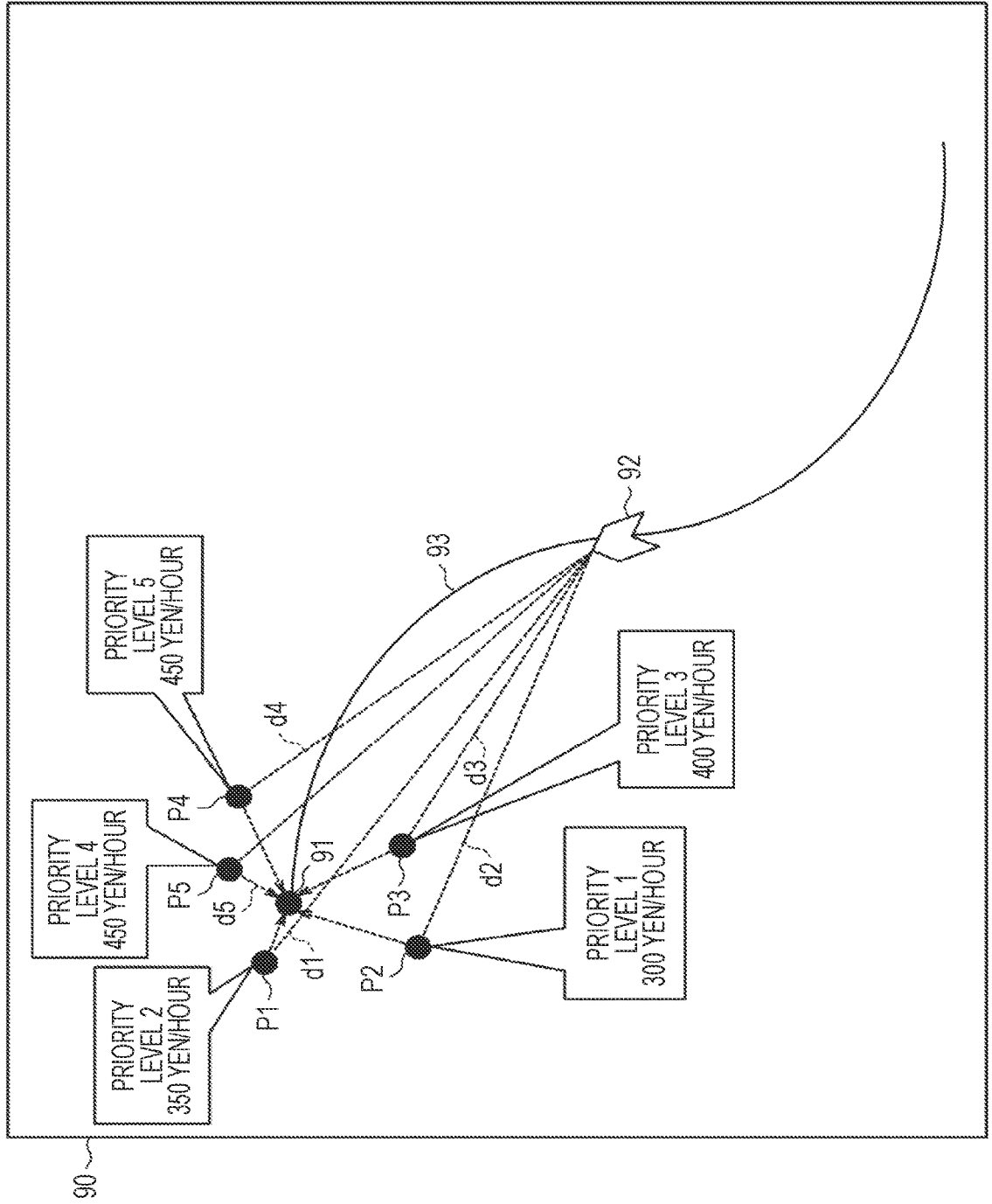
FIG. 9 is a diagram illustrating an example of an output mode of parking lot recommendation information.

FIG. 9 illustrates an example of a display mode of the parking lot recommendation information in the parking fee priority mode. On a route guidance screen 90, a destination 91, a current position 92, and a route 93 are displayed on a map. On the route guidance screen 90, parking lots P1 to P5 which are extracted within a predetermined range from the destination 91 are displayed along with priority levels and parking fees. Here, time distances d1 to d5 corresponding to the required times from the current position 92 to the destination 91 when the vehicle is parked at the parking lots are indicated by dotted lines.

For example, since the parking lot P2 among the extracted parking lots P1 to P5 has the lowest parking fee "300 yen/hour," priority level "1" is given to the parking lot P2. Since the parking lot P1 has a second lowest parking fee "350 yen/hour," priority level "2" is given to the parking lot P1. Since the parking lot P3 has a third lowest parking fee "400 yen/hour," priority level "3" is given to the parking lot P3. Then, since the parking lots P4 and P5 have a fourth lowest parking fee "450 yen/hour" but the time distance d5 corresponding to the parking lot P5 is shorter than the time distance d4 corresponding to the parking lot P4, priority level "4" is given to the parking lot P5 and priority level "5" is given to the parking lot P4. Here, for example, the time distances d1 to d5 corresponding to the parking lots P1 to P5 satisfy $d1<d5<d4<d2 \leq d3$ ($d2=d3$). On the other hand, the priority levels in the parking fee priority mode satisfy $P2>P1>P3>P4>P5$. In this way, the priority levels are given in ascending order of the parking fees instead of using the total required times to the destination 91. In this way, in the parking fee priority mode, more comprehensive information of parking lots can be provided to a user in ascending order of the parking fees, thereby contributing to convenience.

FIG. 10 illustrates an example of a display mode of the parking lot recommendation information in the required time priority mode. Similarly to FIG. 9, a destination 91, a current position 92, and a route 93 are displayed on a route guidance screen 90 and parking lots P1 to P5 which are extracted within a predetermined range from the destination 91 are displayed along with priority levels and parking fees. For example, the time distances d1 to d5 indicating the total required times corresponding to the parking lots P1 to P5 satisfy d1<d5<d4<d2≤d3 (d2=d3) in ascending order. Accordingly, the priority levels are given in ascending order of the total required times. That is, priority level "1" is given to the parking lot P1, priority level "2" is given to the parking lot P5, and priority level "3" is given to the parking lot P4. Since the total required times of the parking lot P2 and the parking lot P3 are the same, the parking lot P2 having the lower parking fee has priority, priority level "4" is given to the parking lot P2, and priority level "5" is given to the parking lot P3. Here, the parking fee ascends in the order of P2, P1, P3, P4, and P5. On the other hand, the priority level in the required time priority mode become higher in the order of P1, P5, P4, P2, and P3. In this way, the priority levels are given in ascending order of the total required times instead of the order of the parking fees. In this way, in the required time priority mode, more comprehensive information of the parking lots can be provided to a user in ascending order of the required times, thereby contributing to convenience.

In any of the parking fee priority mode and the required time priority mode, an availability state of each parking lot, for example, "there is a vacancy," "there are many vacancies," "there are few vacancies," "there is no vacancy," or an imaging time in addition to the availability state, may be displayed. Accordingly, predictability for actual parking can be provided to a user.

As the display mode of the priority levels, various display modes such as ranking using characters such as "A, B, C," ranking using sizes of characters, and ranking using sizes of icons indicating parking lots on a map can be used in addition to the order of numerals as illustrated in FIGS. 9 and 10. When priority levels have only to be displayed, parking fees are not necessarily displayed. The input and output unit 30 may sequentially output the priority levels and the parking fees of the parking lots, for example, by voices based on the priority levels. In any of the parking fee priority mode and the required time priority mode, a plurality of parking lots having the same parking fee and the same required time can be arbitrarily prioritized. For example, regarding availability states of the parking lots, the higher degree of availability may be preferred. When a plurality of parking lots has the same degree of availability, the parking lot having an imaging time closer to the current time may be preferred. Accordingly, it is possible to improve convenience for a user.

As described above, according to this embodiment, it is possible to provide more comprehensive information of parking lots to a user.

The functions included in the units or the operations can be rearranged without logical inconsistency and a plurality of units or operations may be combined into one unit or operation or may be divided.

For example, in the above-mentioned embodiment, some elements and functions of the server 10 may be provided in another device. For example, some elements and functions of the server 10 may be provided in the onboard device 11. For example, the onboard device 11 or the mobile terminal 12 may extract parking lot information including parking fees and availability states from captured image data and transmit the extracted parking lot information to the server 10. Accordingly, it is possible to distribute a process load of the server 10.

The network 13 in this embodiment includes an ad hoc network, a local area network (LAN), a metropolitan area network (MAN), a cellular network, a wireless personal area network (WPAN), a public switched telephone network (PSTN), a terrestrial wireless network, an optical network, another network, or a combination of some thereof in addition to the above-mentioned examples. Examples of elements of a wireless network include an access point (for example, a Wi-Fi access point) and a femtocell. A wireless communication device can be connected to a wireless network using Wi-Fi (registered trademark), Bluetooth (registered trademark), cellular communication techniques, or other radio techniques and technical standards.

In this way, various aspects of the present disclosure can be embodied in many different embodiments and such embodiments are included in the scope of the embodiment.

What is claimed is:

1. An information providing system comprising:
   a device; and
   a server configured to transmit information to and receive information from the device, wherein
   the device includes:
   (i) processing circuitry configured to:
      acquire a destination and an output mode, and
      transmit the acquired destination and the acquired output mode to the server, and
   (ii) output interface circuitry that includes a display, the output interface circuitry configured to output parking lot recommendation information received from the server to the display, and
   the server includes:
   (i) storage circuitry configured to store parking lot information including position information of parking lots and parking fees which are detected from captured image data of the parking lots, and
   (ii) processing circuitry configured to:
      detect the parking fees from the captured image data via a character recognition process,
      prioritize parking lots located within a predetermined range from the destination based on the output mode, and
      provide the parking lot information of the prioritized parking lots as the parking lot recommendation information to the device.

2. The information providing system according to claim 1, wherein
   the output mode is a fee priority mode, and
   the processing circuitry of the server is further configured to prioritize the parking lots in ascending order of parking fees at a scheduled arrival time at the parking lots.

3. The information providing system according to claim 1, wherein
   the output mode is a required time priority mode, and
   the processing circuitry is further configured to prioritize the parking lots in ascending order of a sum of a first required time and a second required time, the first required time being a time required to go from a current position of the device to the parking lots, and the second required time being a time required to go from the parking lots to the destination.

4. The information providing system according to claim 1, wherein the processing circuitry of the server is further configured to:
generate the parking lot information including the parking fees detected from the captured image data and position information corresponding to the captured image data.

5. The information providing system according to claim 4, wherein the processing circuitry of the server is further configured to:
detect an availability of each parking lot from the captured image data and
generate the parking lot information including the availability.

6. The information providing system according to claim 1, wherein
the device includes an input interface circuitry configured to detect an input by a user, and
the processing circuitry of the device is further configured to acquire the destination and the output mode based on a detection result of the input interface circuitry.

7. The information providing system according to claim 6, wherein the output interface circuitry and the input interface circuitry are integrated into a single interface.

8. A server comprising:
communication circuitry configured to transmit information to and receive information from a device or a mobile terminal; and
processing circuitry configured to:
acquire (i) captured image data transmitted from the device or the mobile terminal and (ii) position information of parking lots corresponding to the captured image data,
detect parking fees from the captured image data via a character recognition process,
generate parking lot information including the parking fees and the position information,
acquire a destination and an output mode which are transmitted from the device,
prioritize parking lots which are located within a predetermined range from the destination based on the output mode, and
provide the parking lot information of the prioritized parking lots as parking lot recommendation information to the device.

9. The server according to claim 8, wherein
the output mode is a fee priority mode, and
the processing circuitry is further configured to prioritize the parking lots in ascending order of parking fees at a scheduled arrival time at the parking lots.

10. The server according to claim 8, wherein
the output mode is a required time priority mode, and
the processing circuitry is further configured to prioritize the parking lots in ascending order of a sum of a first required time and a second required time, the first required time being a time required to go from a current position of the device to the parking lots, and the second required time being a time required to go from the parking lots to the destination.

11. A device mounted on a vehicle comprising:
communication circuitry configured to transmit information to and receive information from the server according to claim 8;
storage circuitry configured to store map information including position information of parking lots;
processing circuitry configured to:
transmit a current position of the vehicle, a destination, and an output mode to the server; and
output interface circuitry including a display, the output interface circuitry configured to output to the display parking lot recommendation information received from the server.

12. The device according to claim 11, further comprising:
imaging circuitry configured to image the surroundings of the vehicle as the captured image data.

13. The device according to claim 11, further comprising input interface circuitry configured to detect an input by a user, wherein the processing circuitry is further configured to acquire the destination and the output mode based on a detection result of the input interface circuitry.

14. The device according to claim 13, wherein the output interface circuitry and the input interface circuitry are integrated into a single interface.

15. An information providing method performed by a device and a server configured to transmit information to and receive information from the device, the information providing method comprising:
storing, by the server, parking lot information including position information of parking lots and parking fees detected from captured image data of the parking lots;
acquiring, by the device, a destination and an output mode;
transmitting, by the device, the acquired destination and the acquired output mode to the server;
detecting, by the server, the parking fees from the captured image data via a character recognition process;
prioritizing, by the server, the parking lots which are located within a predetermined range from the destination based on the output mode;
providing, by the server, the parking lot information of the prioritized parking lots as parking lot recommendation information to the device; and
outputting, by the device, the parking lot recommendation information which is received from the server.

16. The information providing method according to claim 15, further comprising prioritizing, by the server, the parking lots in ascending order of parking fees at a scheduled arrival time at the parking lots, wherein the output mode is a fee priority mode.

17. The information providing method according to claim 15, further comprising prioritizing, by the server, the parking lots in ascending order of a sum of a first required time and a second required time, the first required time being time required to go from a current position of the device to the parking lots, and the second required time being time required to go from the parking lots to the destination, wherein the output mode is a required time priority mode.

18. The information providing method according to claim 15, further comprising:
generating, by the server, the parking lot information including the parking fees detected from the captured image data and position information corresponding to the captured image data.

19. The information providing method according to claim 18, further comprising:
detecting, by the server, an availability of each parking lot from the captured image data; and
generating, by the server, the parking lot information including the availability.

20. The information providing method according to claim 15, further comprising:
detecting, by the device, an input by a user; and
acquiring, by the server, the destination and the output mode based on a detection result of the device.

* * * * *